(12) United States Patent
Shiobara et al.

(10) Patent No.: US 7,985,806 B2
(45) Date of Patent: Jul. 26, 2011

(54) DIGLYCIDYLISOCYANURYL-MODIFIED ORGANOPOLYSILOXANE AND COMPOSITION CONTAINING THE SAME

(75) Inventors: Toshio Shiobara, Annaka (JP); Tsutomu Kashiwagi, Annaka (JP); Miyuki Wakao, Takasaki (JP); Manabu Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 27 days.

(21) Appl. No.: 12/360,652

(22) Filed: Jan. 27, 2009

(65) Prior Publication Data

US 2009/0203822 A1    Aug. 13, 2009

(30) Foreign Application Priority Data

Jan. 28, 2008  (JP) ................. 2008-016787
Apr. 17, 2008  (JP) ................. 2008-108038

(51) Int. Cl.
*C08G 77/14*  (2006.01)
*C08L 83/06*  (2006.01)

(52) U.S. Cl. ............ 525/476; 544/221; 528/21; 528/25; 528/26; 528/27; 528/31; 528/33; 524/323; 524/809

(58) Field of Classification Search .................. 524/588, 524/267
See application file for complete search history.

(56) References Cited

U.S. PATENT DOCUMENTS

| 2002/0190262 | A1 | 12/2002 | Nitta et al. | |
|---|---|---|---|---|
| 2004/0198924 | A1* | 10/2004 | Young et al. | 525/474 |
| 2007/0145615 | A1* | 6/2007 | Heki | 264/1.34 |
| 2007/0265427 | A1* | 11/2007 | Takai et al. | 528/405 |
| 2008/0139734 | A1* | 6/2008 | Nakashima et al. | 524/505 |
| 2010/0125116 | A1* | 5/2010 | Shiobara et al. | 524/413 |

FOREIGN PATENT DOCUMENTS

| EP | 1 505 121 A1 | 2/2005 |
|---|---|---|
| JP | 7-274571 A | 10/1995 |
| JP | 2004-99751 A | 4/2004 |
| JP | 2004-099751 A | 4/2004 |
| JP | 2004-238589 A | 8/2004 |
| JP | 2005-263869 A | 9/2005 |

OTHER PUBLICATIONS

Database WPI Week 200438, Thomson Scientific, London, GB; AN 2004-403483, XP-002530736, pp. 1-3.

* cited by examiner

*Primary Examiner* — Marc S Zimmer
*Assistant Examiner* — Lindsay Nelson
(74) *Attorney, Agent, or Firm* — Birch, Stewart, Kolasch & Birch, LLP

(57) ABSTRACT

An organopolysiloxane represented by formula (1) shown below and having (3,5-diglycidylisocyanuryl)alkyl groups represented by formula (2) at least at both terminals of the main chain:

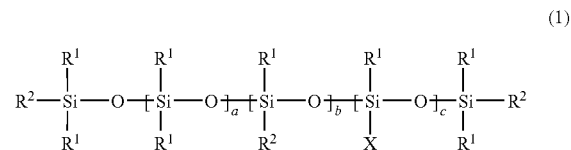

wherein, each $R^1$ represents, independently, a substituted or unsubstituted monovalent hydrocarbon group of 1 to 20 carbon atoms, $R^2$ is a group represented by formula (2) shown below, X is a group represented by formula (3) shown below, a represents an integer of 0 to 100 and b represents an integer of 0 to 30, provided that $1 \leq a+b$, and c represents an integer of 0 to 10

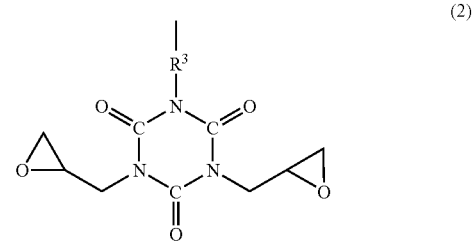

wherein, $R^3$ represents an alkylene group of 2 to 12 carbon atoms

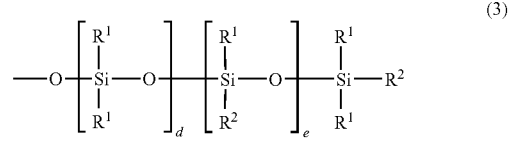

wherein, $R^1$ and $R^2$ are as defined above, d represents an integer of 0 to 30, and e represents an integer of 0 to 30.

15 Claims, 4 Drawing Sheets

US 7,985,806 B2

DIGLYCIDYLISOCYANURYL-MODIFIED ORGANOPOLYSILOXANE AND COMPOSITION CONTAINING THE SAME

FIELD OF THE INVENTION

The present invention relates to an organopolysiloxane which has diglycidylisocyanurylalkyl groups at least at both terminals of the main chain and yields a cured product having excellent heat resistance, light resistance and transparency. The present invention also relates to a composition for encapsulating an optical semiconductor element comprising the organopolysiloxane.

BACKGROUND OF THE INVENTION

Conventionally, transparent epoxy resin compositions have been widely used for encapsulating optical semiconductor elements such as LEDs. These epoxy resin compositions typically comprise an alicyclic epoxy resin, a curing agent and a curing catalyst, and are used in a molding method such as a casting or transfer molding method, by pouring the composition into a mold having an optical semiconductor element positioned therein and subsequently curing the composition, thereby encapsulating the optical semiconductor element (see Patent Document 1).

However in recent years, as the brightness and output of LEDs have continued to increase, problems have started to emerge for conventional transparent epoxy resin cured products, including discoloration of the resin over time upon exposure to short wavelength blue light or ultraviolet light, and the occurrence of cracking during temperature cycle tests.

Known techniques for preventing this type of light degradation include introducing epoxy groups and/or oxetanyl groups into a siloxane (see Patent Document 2), and introducing epoxy groups into a silsesquioxane (see Patent Document 3).

Furthermore, the use of a hard rubber-like silicone resin as a protective coating for preventing cracking has also been proposed (see Patent Document 4). Moreover, the use of a silicone resin containing introduced isocyanuric acid derivative groups as a stress reduction agent for an epoxy resin cured product is also known (see Patent Document 5).

However, if the above compositions are used within casetype light emitting semiconductor devices, namely devices in which a light emitting element is placed inside a ceramic and/or plastic casing, and the inside of the casing is then filled with the silicone resin, then none of the compositions is able to provide totally satisfactory levels of both light resistance and crack resistance.

[Patent Document 1] JP 7-274571A
[Patent Document 2] JP 2004-238589A
[Patent Document 3] JP 2005-263869A
[Patent Document 4] US2002/0190262A1
[Patent Document 5] JP 2004-99751A

SUMMARY OF THE INVENTION

The present invention takes the above circumstances into consideration, and has an object of providing a compound that yields a cured product having excellent light resistance and crack resistance, and a resin composition for encapsulating an optical semiconductor that includes the compound.

As a result of intensive investigation aimed at achieving the above object, the inventors of the present invention has found that an organopolysiloxane described below yielded a cured product having excellent light resistance and crack resistance.

The present invention provides an organopolysiloxane represented by formula (1) shown below and having (3,5-diglycidylisocyanuryl)alkyl groups represented by formula (2) at least at both terminals of the main chain.

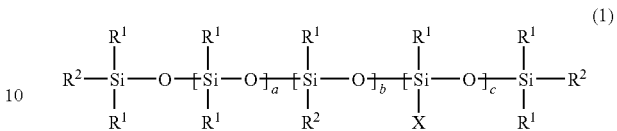

wherein each $R^1$ represents, independently, a substituted or unsubstituted monovalent hydrocarbon group of 1 to 20 carbon atoms, $R^2$ is a group represented by formula (2) shown below, X is a group represented by formula (3) shown below, a represents an integer of 0 to 100 and b represents an integer of 0 to 30, provided that $1 \leq a+b$, and c represents an integer of 0 to 10,

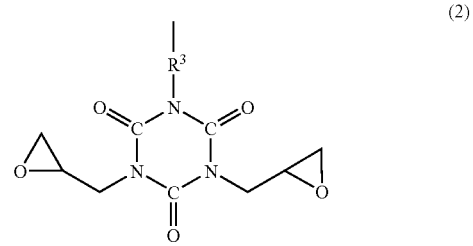

wherein $R^3$ represents an alkylene group of 2 to 12 carbon atoms,

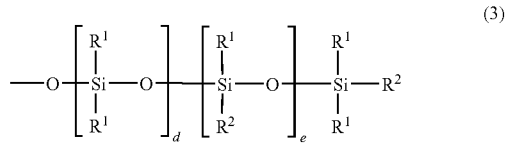

wherein $R^1$ and $R^2$ are as defined above, d represents an integer of 0 to 30, and e represents an integer of 0 to 30.

Furthermore, the present invention also provides a composition for encapsulating an optical semiconductor element which composition includes the above organopolysiloxane.

Because the organopolysiloxane of the present invention comprises (3,5-diglycidylisocyanuryl)alkyl groups at both terminals of the main chain, and preferably also as side chains, the organopolysiloxane is highly reactive, and is able to form a cured product that exhibits a high degree of hardness due to cross-linked structures in a short period of time. The cured product exhibits excellent crack resistance and excellent light resistance.

DETAILED DESCRIPTION OF THE PREFERRED EMBODIMENTS

Figure 1:
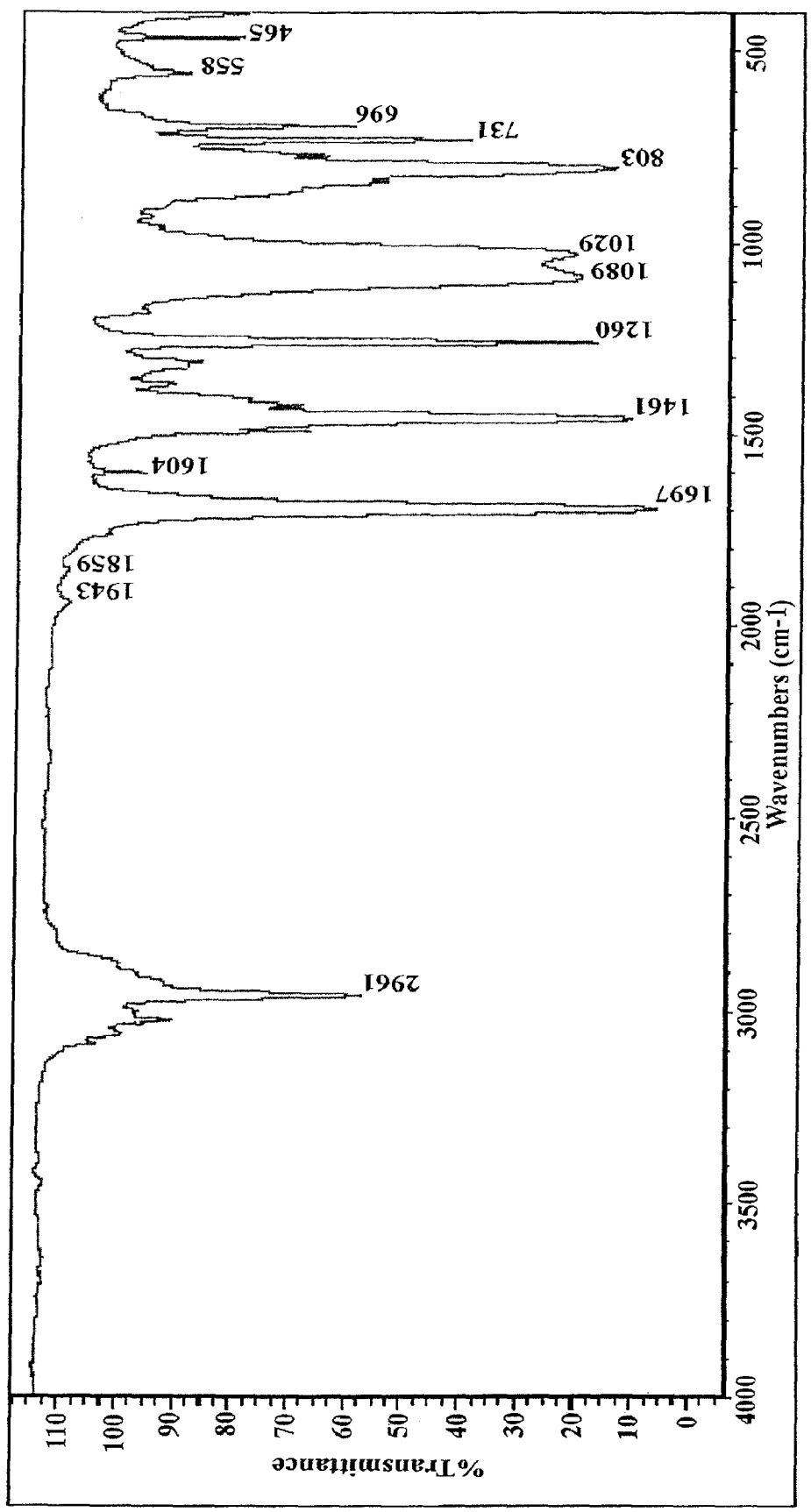
FIG. 1 An IR spectrum of a compound I prepared in the examples.

I. Organopolysiloxane of the Present Invention and Method of Producing the Same

The organopolysiloxane of the present invention comprises (3,5-diglycidylisocyanuryl)alkyl groups represented by formula (2) shown below at least at both terminals of the siloxane main chain.

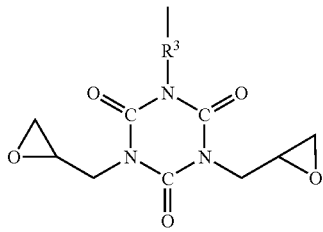

(2)

In the formula (2), $R^3$ represents an alkylene group of 2 to 12 carbon atoms such as an ethylene group, propylene group or butylene group, and is preferably a propylene group.

In formula (1), a represents an integer of 0 to 100, preferably 0 to 30 and even more preferably 0 to 20, and b represents an integer of 0 to 30 and preferably 0 to 10, provided that a+b is 1 or greater. If a or b exceeds the upper limit of the above range, then epoxy group equivalent weight of such an organopolysiloxane is overly large, and desired crack resistance, hardness and gas permeation resistance may not be attained.

Each $R^1$ represents, independently, a monovalent hydrocarbon group of 1 to 20 carbon atoms. Examples of $R^1$ include alkyl groups such as a methyl group, ethyl group, propyl group or butyl group, alicyclic groups such as a cyclohexyl group, aryl groups such as a phenyl group, and substituted groups thereof such as a 3,3,3-trifluoropropyl group, 3-hydroxypropyl group or 3-aminopropyl group. Of these groups, a methyl group or phenyl group is preferred, and at least 90 mol % of all the $R^1$ are preferably methyl groups.

In formula (1), c is preferably 1 or greater in terms of the crack resistance, and is more preferably c ranges from 1 to 6. If c exceeds 10, then a cured product has a overly high crosslinking density to be brittle.

The side chain X is represented by formula (3) shown below.

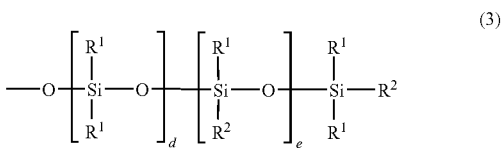

(3)

In this formula (3), $R^2$ represents a group represented by formula (2) above, d and e each represents, independently, an integer of 0 to 30, preferably 0 to 20, and more preferably 0 to 10. An organopolysiloxane with d or e exceeding the upper limit of the above range tends to have poor compatibility with the curing agent.

Examples of the organopolysiloxane of the present invention are shown below. In the formulas, a, c and d are as defined above.

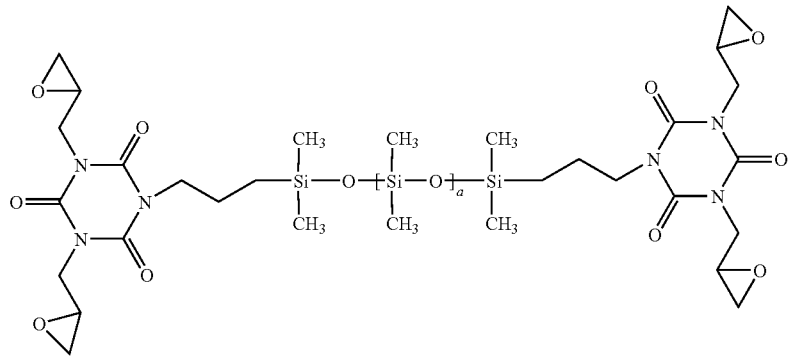

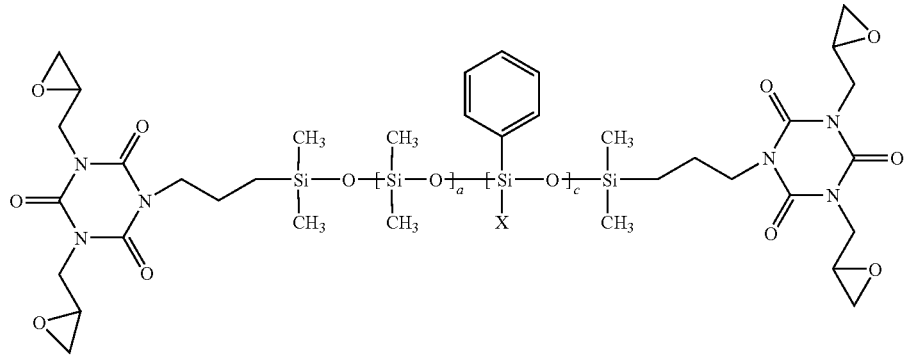

X:

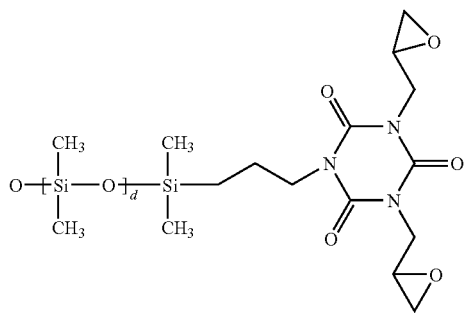

The present organopolysiloxane may be produced by reacting at least 1 mol, and preferably 1.0 to 1.5 mols, of a 3,5-diglycidylisocyanurate having an alkenyl group of 2 to 12 carbon atoms such as a vinyl group, 1-allyl group or 1-undecenyl group, with 1 mol of a hydrosilyl group of an organohydrogensiloxane represented by formula (4) shown below by heating at a temperature of 80 to 150° C. in the presence of an addition reaction catalyst such as a platinum catalyst.

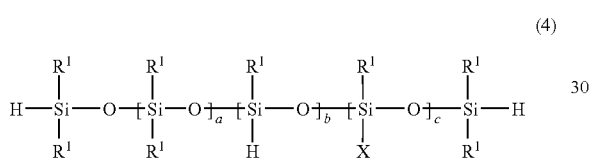
(4)

In the formula (4), $R^1$, X, and a to c are as defined above.

If the quantity of 3,5-diglycidylisocyanurate having an alkenyl group is less than the lower limit of the above range, then large quantities of unreacted hydrosilyl groups remain in the product organopolysiloxane, which can cause foaming during curing of a composition containing the organopolysiloxane. If the quantity exceeds the upper limit of the range, then unreacted 3,5-diglycidylisocyanurate having an alkenyl group remains within a composition, which can cause a deterioration in the properties of the cured product.

A 2% octyl alcohol solution of chloroplatinic acid can be used as the platinum catalyst in an amount of approximately 5 to 50 ppm as platinum metal. The reaction may be performed at a temperature of 80 to 100° C. for a period of 1 to 8 hours to synthesize an targeted compound with a high yield. In the reaction, an aromatic or ketone-based solvent may be used if desired.

Examples of the polyorganohydrogensiloxane represented by formula (4) are shown below. Mixtures of these organohydrogensiloxanes may also be used.

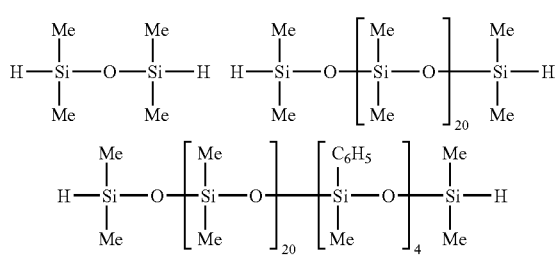

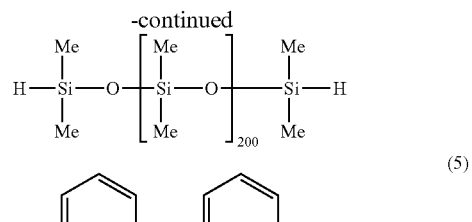
(5)

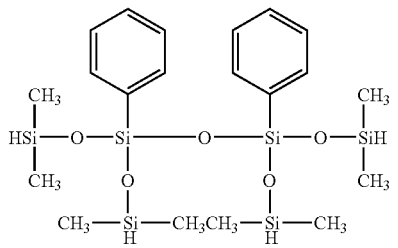
(6)

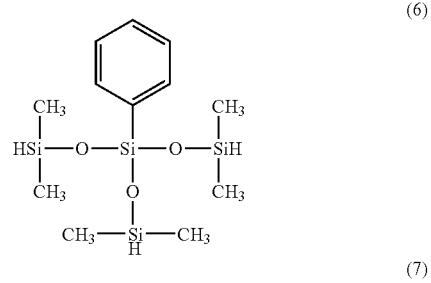
(7)

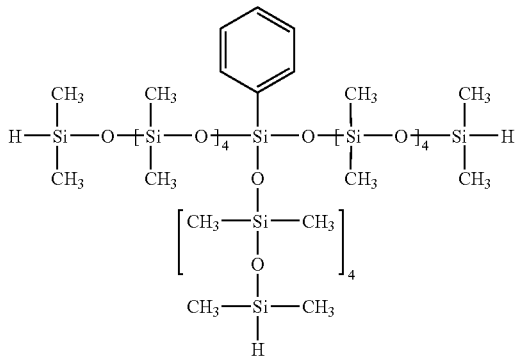

II. Composition

A composition comprising the organopolysiloxane of the present invention (hereafter, the organopolysiloxane may also be referred to as component (A)) is explained below.

The composition further comprises a curing agent (C) that reacts with the epoxy groups. Examples of this curing agent include commonly used amine-based curing agents and acid anhydride-based curing agents, among which acid anhydride-based curing agents are preferred for the reason that favorable light transmittance and heat resistance are attained.

Examples of the acid anhydride-based curing agents include succinic anhydride, phthalic anhydride, maleic anhydride, trimellitic anhydride, pyromellitic anhydride, hexahydrophthalic anhydride, 3-methyl-hexahydrophthalic anhydride, 4-methyl-hexahydrophthalic anhydride or mixtures of 4-methyl-hexahydrophthalic anhydride and hexahydrophthalic anhydride, tetrahydrophthalic anhydride, methyltetrahydrophthalic anhydride, nadic anhydride, methylnadic anhydride, norbornane-2,3-dicarboxylic anhydride, methylnorbornane-2,3-dicarboxylic anhydride, and methylcyclohexenedicarboxylic anhydride. The curing agent (C) is incorporated in the composition in an amount of 10 to 100 parts by mass, and preferably from 20 to 60 parts by mass, per 100 parts by mass of the component (A). This quantity corresponds to 0.5 to 1.5 equivalents, and preferably 0.8 to 1.2 equivalents, of epoxy-reactive functional groups per equivalent of epoxy groups.

In order to ensure that the curing reaction is completed smoothly and within a short period of time, the composition of the present invention also comprises a curing catalyst (D). Preferred curing catalyst is one or more quaternary phosphonium salts, particularly one or more quaternary phosphonium salts represented by formula (8) and/or formula (9) shown below. Using such a catalyst enables a cured product to be obtained that is transparent, exhibits no surface tack, and undergoes no discoloration. An example of a quaternary phosphonium salt other than the compounds represented by formulas (8) and (9) below is quaternary phosphonium bromide (U-CAT5003, a product name, manufactured by San-Apro Ltd.).

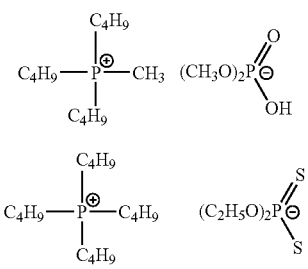

(8)

(9)

The above catalysts may be used in combination with other curing catalysts. Examples of these other curing catalysts include organic phosphine-based curing catalysts such as triphenylphosphine and diphenylphosphine, tertiary amine-based curing catalysts such as 1,8-diazabicyclo(5,4,0)undecene-7, triethanolamine and benzyldimethylamine, and imidazoles such as 2-methylimidazole and 2-phenyl-4-methylimidazole.

The blend quantity of the curing catalyst (D) ranges preferably from 0.05 to 3 parts by mass per 100 parts by mass of the combination of the components (A) and (C). If the blend quantity of the curing catalyst is less than 0.05 parts by mass, then the catalyst may not provide sufficient acceleration of the reaction between the epoxy resin and the curing agent. In contrast, more than 3 parts by mass of the curing catalyst may cause discoloration, either during curing or during reflow process.

The composition of the present invention may also include (B) an epoxy compound or resin having no siloxane bonds. Examples of the component (B) include aromatic epoxy resins such as bisphenol A epoxy resins, bisphenol F epoxy resins, phenol novolak epoxy resins, cresol novolak epoxy resins, naphthalene epoxy resins, biphenyl epoxy resins, phenol aralkyl epoxy resins and biphenyl aralkyl epoxy resins, hydrogenated epoxy resins obtained by hydrogenation of the aromatic rings of each of the above epoxy resins, dicyclopentadiene epoxy resins, alicyclic epoxy resins, epoxy compounds or resins containing an isocyanurate ring such as triglycidyl isocyanurate shown below in formula (10), as well as mixtures of the above compounds or resins. Of these, from the viewpoint of light resistance, the use of a hydrogenated epoxy resin, an alicyclic epoxy resin or triglycidyl isocyanurate is preferred.

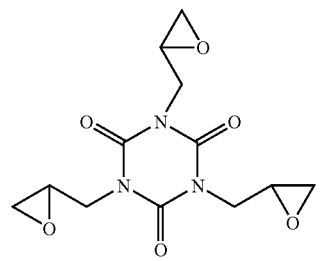

(10)

The blend quantity of the epoxy compound or resin having no siloxane bonds (B) typically ranges from 1 to 100 parts by mass, and preferably from 10 to 40 parts by mass, per 100 parts by mass of the component (A). If the blend quantity exceeds the upper limit of the above range, then a cured product of such a resin composition tends to lack flexibility, which may cause cracking during temperature cycle testing or unsatisfactory adhesion.

In terms of enhancing the adhesive strength of the cured product, the composition of the present invention preferably comprises an adhesion-imparting agent (H). In a preferred composition, a mercaptosilane-based coupling agent such as mercaptotrimethoxysilane is added in an amount of from 0.1 to 3 parts by mass per 100 parts by mass of the combination of the components (A) and (C).

To improve the heat resistance, the composition of the present invention may further comprise an antioxidant (E), and preferably a hindered phenol-based antioxidant in an amount of from 0.1 to 5 parts by mass per 100 parts by mass of the combination of the components (A) and (C). Examples of the antioxidant include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylenebis [3-(3,5-di-tert-butyl-4-hydroxyphenyl)propionate], N,N'-hexane-1,6-diylbis[3-(3,5-di-tert-butyl-4-hydroxyphenylpropionamide)], 2,4-dimethyl-6-(1-methylpentadecyl)phenol, diethyl[[3,5-bis(1,1-dimethylethyl)-4-hydroxyphenyl]methyl]phosphonate, 3,3', 3",5,5',5"-hexa-tert-butyl-a,a',a"-(mesitylene-2,4,6-triyl)tri-p-cresol, 4,6-bis(octylthiomethyl)-o-cresol, ethylenebis (oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, and 2,6-di-tert-butyl-4-(4,6-bis(octylthio)-1,3,5-triazin-2-ylamino)phenol.

Phosphorus-based antioxidants may also be used as the antioxidant. Examples of the phosphorus-based antioxidants include triphenyl phosphite, bis[2,4-bis(1,1-dimethylethyl)-6-methylphenyl]ethyl ester of phosphorous acid, tris(2,4-di-t-butylphenyl)phosphite, tetrakis(2,4-di-tert-butylphenyl)[1, 1-biphenyl]-4,4'-diylbisphosphonite, 2,2',2"-nitrilo[triethyl-tris[3,3',5,5'-tetra -tert-butyl-1,1'-biphenyl-2,2'-diyl]] phosphite, and diethyl[[3,5-bis(1,1-dimethylethyl)-4-hydroxyphenyl]methyl]phosphonate.

To improve the light resistance, the composition of the present invention may also include a photostabilizer (F), and preferably a hindered amine-based photostabilizer in an amount of from 0.1 to 5 parts by mass per 100 parts by mass of the combination of the components (A) and (C). Examples of the photostabilizer include 2,2,4,4-tetramethyl-7-oxa-3,20-diazadispiro[5.1.11.2]-heneicosan-21-one, 2,2,4,4-tetramethyl-21-oxo-7-oxa-3,20-diazadispiro[5.1.11.2]-heneicosane-20-propionic acid dodecyl ester, 2,2,4,4-tetramethyl-21-oxo-7-oxa-3,20-diazadispiro[5.1.11.2]-heneicosane-20-propionic acid tetradecyl ester, bis(1,2,2,6,6-pentamethyl-4-piperidyl)[[3,5-bis(1,1-dimethylethyl)-4-hydroxyphenyl]methyl]butylmalonate, bis(2,2,6,6-tetramethyl-4-piperidyl) sebacate, poly[{6-(1,1,3,3-tetramethylbutyl)amino-1,3,5-triazin-2,4-diyl}{(2,2,6,6-tetramethyl-4-piperidyl) imino}hexamethylene {(2,2,6,6-tetramethyl-4-piperidyl) imino}], 2-(2H-benzotriazol-2-yl)-4,6-bis(1-methyl-1-phenylethyl)phenol, and 2-(2H-benzotriazol-2-yl)-4,6-di-tert-pentylphenol.

The composition of the present invention may further comprise fluorescent powder (G) for the purpose of converting an emission wavelength of a LED such as a blue LED or UV LED. One example of the fluorescent powder is yellow fluorescent powder and the one containing fluorescent particles composed of garnet group particles represented by a general formula $A_3B_{50}O_{12}$:M (wherein, component A includes at least one element selected from the group consisting of Y, Gd, Tb, La, Lu, Se and Sm, component B includes at least one element selected from the group consisting of Al, Ga and In, and component M includes at least one element selected from the group consisting of Ce, Pr, Eu, Cr, Nd and Er) is particularly advantageous. Examples of the fluorescent powder suitably used for LED that radiates either blue or white light include a $Y_3Al_5O_{12}$:Cc phosphor and/or a $(Y,Gd,Tb)_3(Al,Ga)_5O_{12}$:Ce phosphor. Examples of other fluorescent powder include $CaGa_2S_4$:$Ce^{3+}$ and $SrGa_2S_4$:$Ce^{3+}$, $YAlO_3$:$Ce^{3+}$, $YGaO_3$:$Ce^{3+}$, $Y(Al,Ga)O_3$:$Ce^{3+}$, and $Y_2SiO_5$:$Ce^{3+}$. Furthermore, in order to generate mixed color light, rare earth element-doped aluminates and rare earth element-doped orthosilicates and the like may be used in combination with the above fluorescent powder. The quantity of the fluorescent powder (G) ranges from 0.1 to 100 parts by mass per 100 parts by mass of the combination of the components (A) and (C).

The composition of the present invention may also comprise an inorganic filler (I) for the purposes of preventing precipitation of the fluorescent powder described above, diffusing the light from the LED, and reducing the coefficient of expansion. The inorganic filler (I) is typically used in an amount of from 0.1 to 100 parts by mass per 100 parts by mass of the combination of the components (A) and (C). Examples of the inorganic filler include silica, titanium oxide, zinc aluminum oxide, and calcium carbonate.

Besides the components described above, additives such as discoloration prevention agents, silane coupling agents, plasticizers and diluents and the like may also be added to the composition in such quantities that they do not impair the effects of the present invention.

The resin composition of the present invention is advantageously used as an encapsulating agent to coat and protect an optical semiconductor element. Examples of the optical semiconductor element include light emitting diodes (LED), organic electroluminescent elements (organic EL), laser diodes and LED arrays.

The composition of the present invention is suitable for producing case-type light emitting semiconductor devices, namely placing a light emitting element inside a ceramic and/or plastic casing, and filling the inside of the casing with the composition to cover the light emitting element positioned inside the casing followed by curing the composition. Furthermore, the composition can also be used for protecting an LED mounted on a matrix-type substrate, by applying the composition to the LED using a printing method, or a transfer molding, injection molding or compression molding method, and then curing the composition. In those cases where an LED or the like is coated and protected by potting or injection, the composition of the present invention is preferably a liquid at room temperature. In other words, the viscosity of the resin composition, reported as a value measured at 25° C. using a rotational viscometer, is preferably within a range from 10 to 1,000,000 mPa·s, and even more preferably from 100 to 1,000,000 mPa·s. On the other hand, in those cases where the light emitting semiconductor device is produced by transfer molding or the like, the composition can be in the form of not only liquid but also solid prepared by solidifying the composition to increase its viscosity (B-staging), and then palletizing.

The curing conditions for the composition of the present invention are preferably set within a range of from 72 hours at 25° C. to 3 minutes at 200° C., depending on factors such as productivity, heat resistance of the light emitting element and/or the casing. In the case of transfer molding or injection molding, molding is conducted, for example, at a temperature of 150 to 180° C. and a pressure of 20 to 50 kgf/cm² for a period of 1 to 5 minutes. Post-curing may be conducted at 150 to 200° C. for a period of 1 to 4 hours.

EXAMPLES

The present invention is explained in further detail below with reference to a series of examples and comparative examples, although the present invention is in no way limited by these examples. In the following description, "parts" refers to "parts by mass", and "Me" represents a methyl group.

Example 1

In a 0.5 liter separable flask, 56.2 grams (0.2 mol) of 1-allyl-3,5-diglycidylisocyanurate and 72.6 grams (0.1 mol) of a silicone having hydrosilyl groups at both terminals represented by an average molecular formula shown below (hereafter referred to as "hydrogensiloxane A") were placed, to which a 2% octyl alcohol solution of chloroplatinic acid (Pt quantity: 20 ppm) was added. The mixture thus obtained was subjected to a reaction at 80 to 100° C. for 6 hours. Subsequently, unreacted materials were removed by distillation under reduced pressure, yielding 125 g of a colorless transparent liquid (compound I) with a yield of 97%.

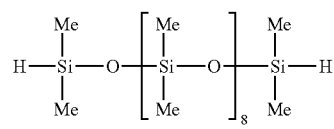

The obtained colorless transparent liquid showed the following properties.

Epoxy equivalent weight: 320 g/mol, refractive index: 1.459, elemental analysis: C: 0.4105 (0.4099), Si: 0.2172 (0.2174), O: 0.2363 (0.2360), N: 0.0658 (0.0652), H: 0.0702

(0.0714) (wherein the values in parentheses represent the theoretical values), specific gravity (23° C.): 1.09, viscosity (23° C.): 1.10 Pa·s.

Figure 2:
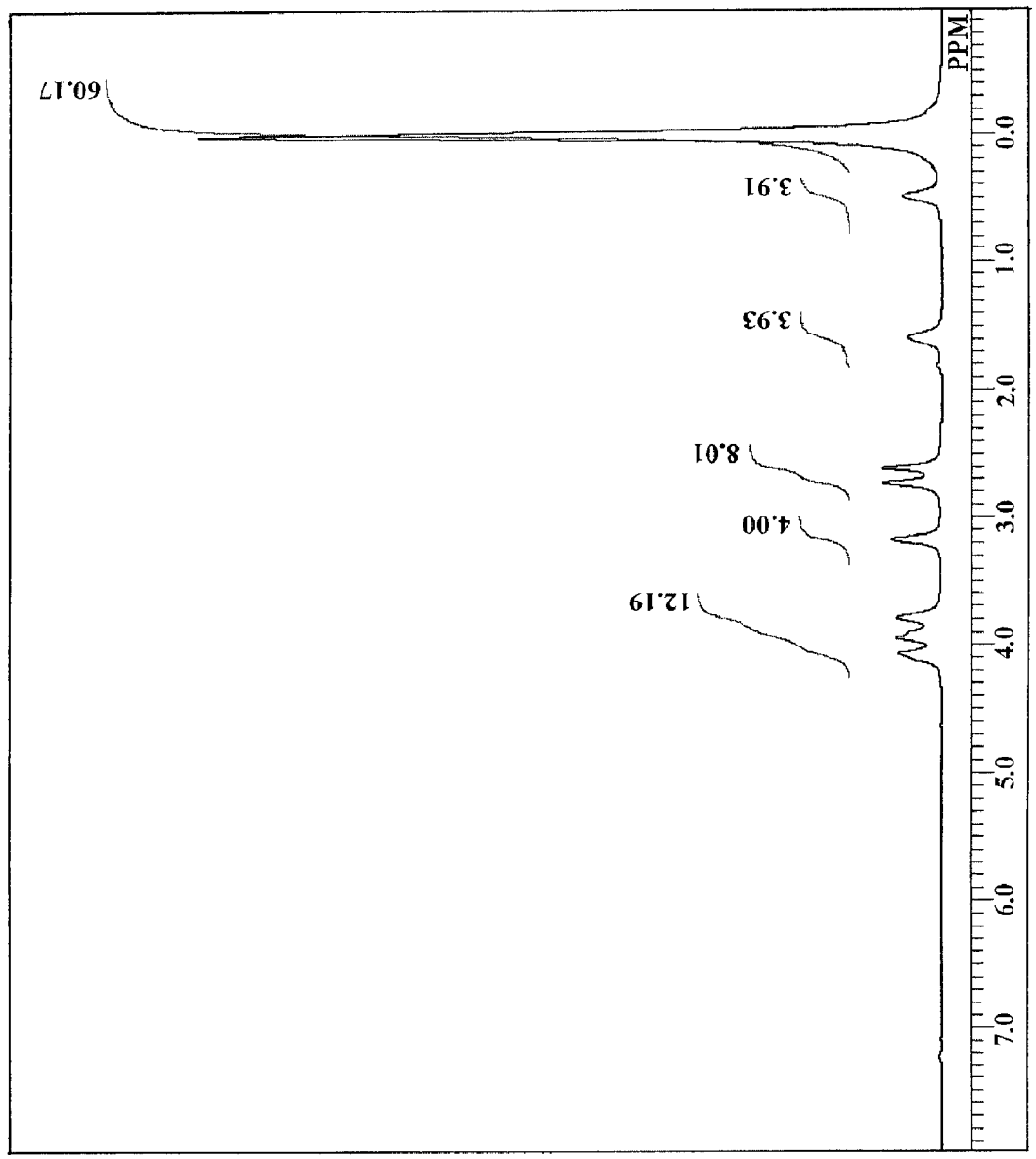
FIG. 2 A NMR spectrum of the compound I prepared in the examples.

The results of analyses by IR (AVATAR 360 FT-IR, manufactured by Nicolet Corporation) and NMR (JNM-LA300WB, 300 MHz, $^1$H-NMR, manufactured by JEOL Ltd.) spectroscopy of the compound I are shown in FIG. 1 and FIG. 2 respectively.

Examples 2 to 4

Using hydrogensiloxanes B to D shown below in the quantities shown in Table 1 in place of hydrogensiloxane A, reactions were conducted with 1-allyl-3,5-diglycidylisocyanurate in the same manner as example 1, yielding compounds II to IV respectively.

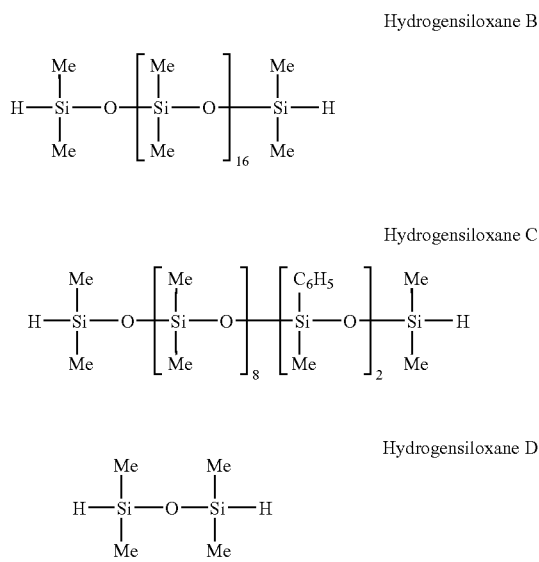

Hydrogensiloxane B

Hydrogensiloxane C

Hydrogensiloxane D

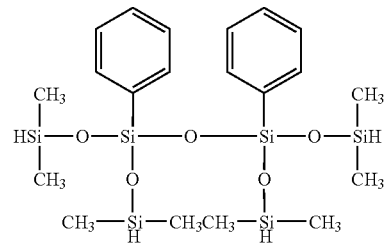

A 2% octyl alcohol solution of chloroplatinic acid (Pt quantity: 20 ppm) was then added, and the mixture thus obtained was subjected to a reaction at 80 to 100° C. for 6 hours. Subsequently, unreacted materials were removed by distillation under reduced pressure, yielding 224 g of a colorless transparent liquid (compound V) with a yield of 91%.

The compound V showed the following properties:

Epoxy equivalent weight (measured using an automatic titrator GT-100, manufactured by Mitsubishi Chemical Corporation): 370 g/mol, refractive index (measured at 25° C. using a digital refractometer RX5000, manufactured by Atago Co., Ltd.): 1.52452, elemental analysis: C: 0.4907 (0.4944), Si: 0.1030 (0.1020), O: 0.2463 (0.2421), N: 0.1058 (0.1017), H: 0.0542 (0.0598) (wherein the values in parentheses represent the theoretical values), specific gravity (23° C.): 1.09, viscosity (60° C.): 3.30 Pa·s.

Figure 3:
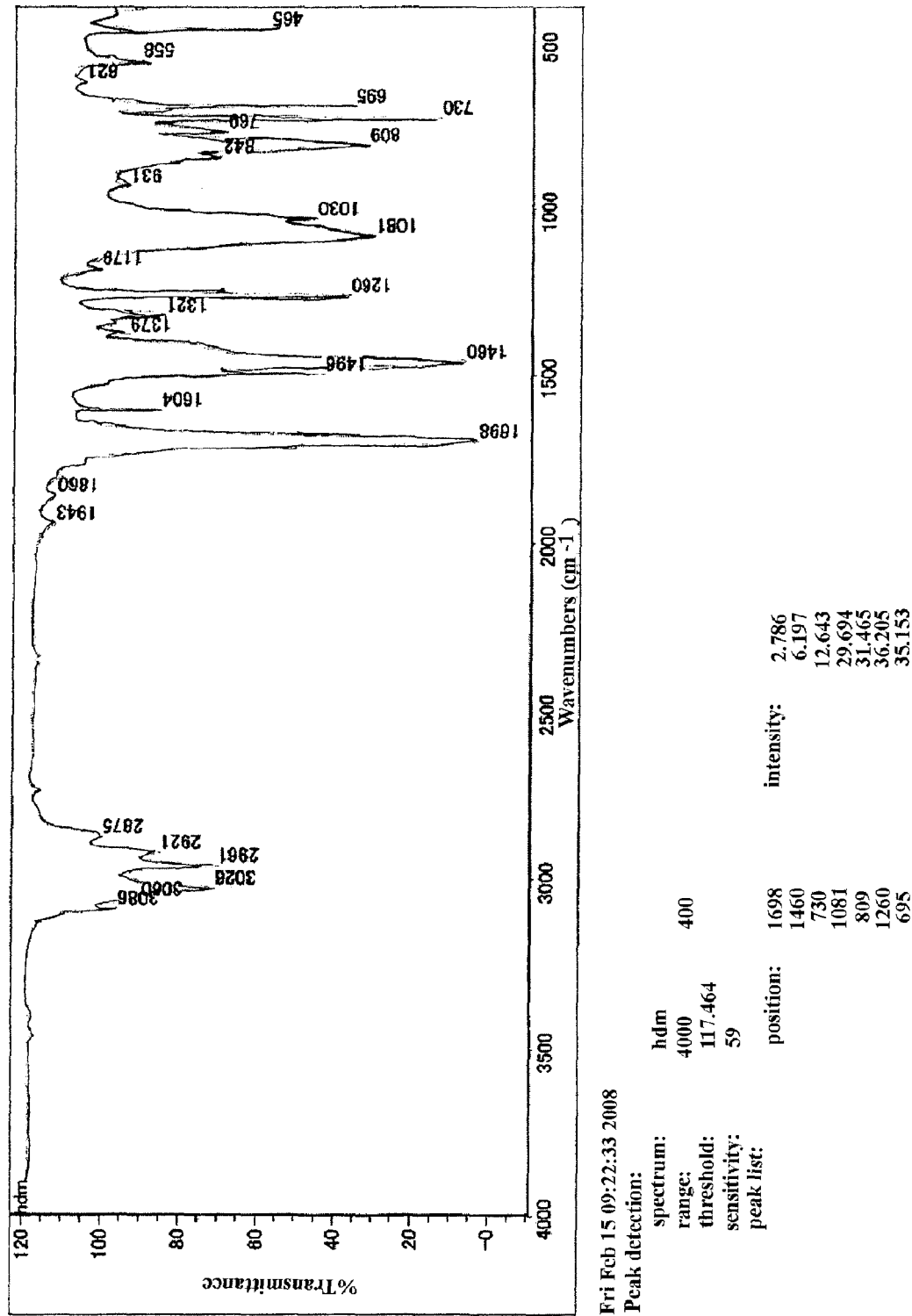
FIG. 3 An IR spectrum of the compound V prepared in the examples.
Figure 4:
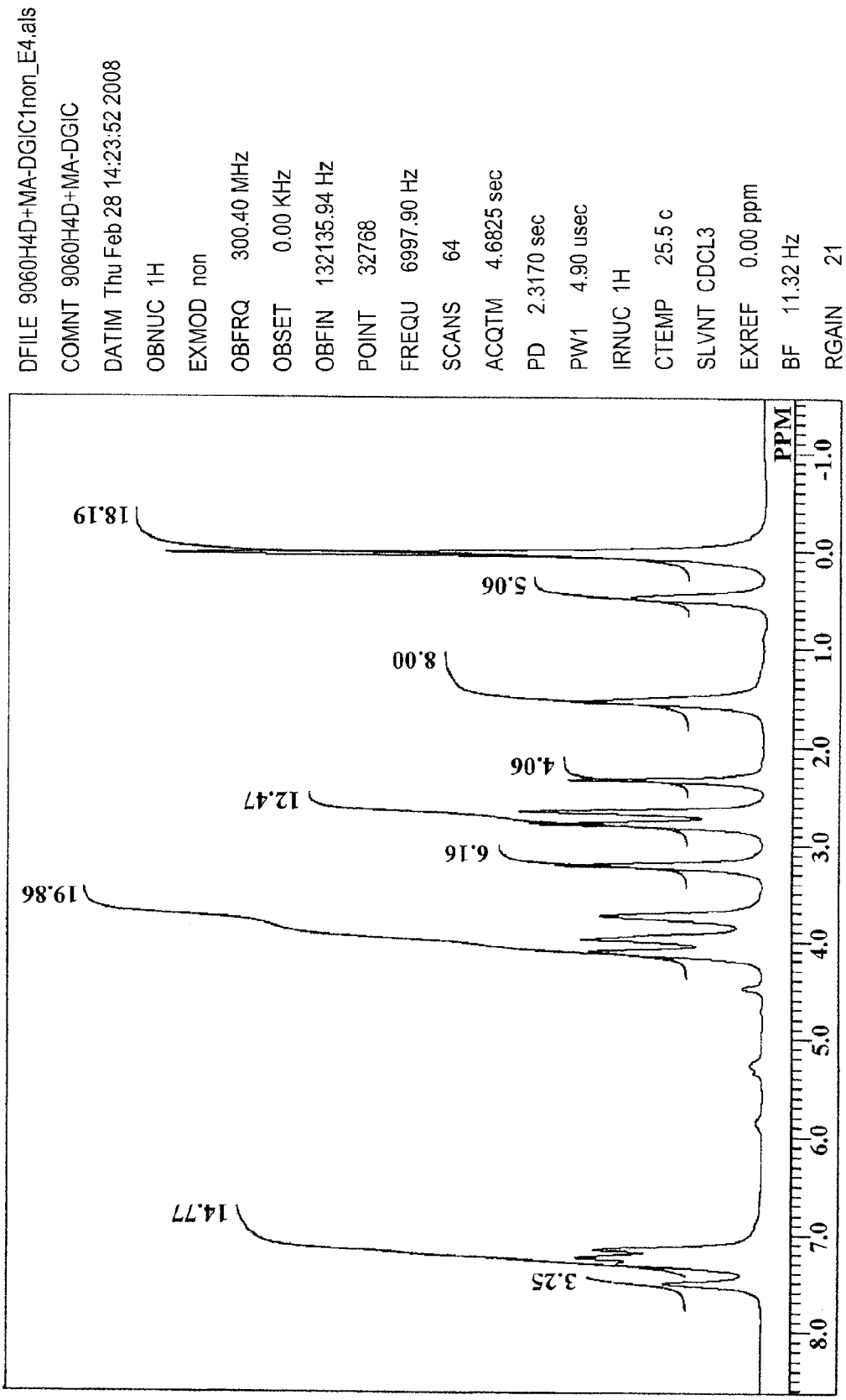
FIG. 4 A NMR spectrum of the compound V prepared in the examples.

The IR and NMR spectra for the compound V, measured using the same apparatus as those used for the compound I, are shown in FIG. 3 and FIG. 4 respectively.

TABLE 1

| Example | | 2 | 3 | 4 |
|---|---|---|---|---|
| Hydrogensiloxane | Type | B | C | D |
| | Quantity (g) | 132 | 112 | 13.4 |
| 1-allyl-3,5-diglycidylisocyanurate | Quantity (g) | 56.5 | 56.5 | 56.5 |
| Compound | | II | III | IV |
| External appearance | | Colorless transparent liquid | Colorless transparent liquid | Colorless solid |
| Epoxy equivalent weight | g/mol | 470 | 420 | 174 |
| Elemental analysis (values in parentheses are theoretical values) | C | 0.3831 (0.3829) | 0.4949 (0.4951) | 0.4830 (0.4827) |
| | Si | 0.2679 (0.2681) | 0.2041 (0.2039) | 0.0802 (0.0805) |
| | O | 0.2292 (0.2298) | 0.2038 (0.2039) | 0.2532 (0.2529) |
| | N | 0.0451 (0.0447) | 0.0435 (0.0436) | 0.1212 (0.1207) |
| | H | 0.0747 (0.0745) | 0.0537 (0.0534) | 0.0624 (0.0632) |

Example 5

In a 0.5 liter separable flask, 157.0 grams (0.56 mol) of 1-allyl-3,5-diglycidylisocyanurate and 71.7 grams (0.14 mol) of a hydrogensiloxane represented by a formula shown below (hereafter referred to as "hydrogensiloxane E") were placed.

Examples 6 to 8

Using hydrogensiloxanes F, G and H shown below in the quantities shown in Table 2 instead of the hydrogensiloxane E, reactions were conducted in the same manner as example 5, yielding compounds VI, VII and VIII respectively.

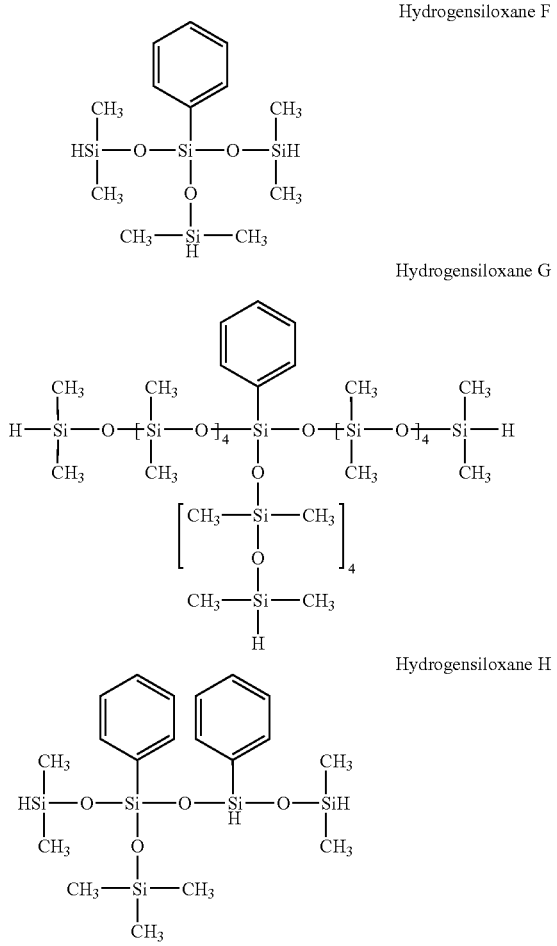

Hydrogensiloxane F

Hydrogensiloxane G

Hydrogensiloxane H yielding a series of curable resin compositions. The components listed in the tables below were as follows.

Epoxy I: triglycidyl isocyanurate (TEPIC-S, manufactured by Nissan Chemical Industries, Ltd.)
Epoxy II: a bisphenol A epoxy resin (JER828, manufactured by Japan Epoxy Resins Co., Ltd.)
Curing agent: 4-methylhexahydrophthalic anhydride (RIKACID MH, manufactured by New Japan Chemical Co., Ltd.)
Curing catalyst: a quaternary phosphonium salt (U-CAT5003, manufactured by San-Apro Ltd.)
Adhesion-imparting agent: γ-mercaptopropyltrimethoxysilane, KBM803 (manufactured by Shin-Etsu Chemical Co., Ltd.)
Antioxidant I: pentaerythritol tetrakis[3-(3,5-di-tert-butyl-4-hydroxyphenyl)propionate]
Antioxidant II: triphenyl phosphite
Photostabilizer: 2,2,4,4-tetramethyl-21-oxo-7-oxa-3,20-diazadispiro[5.1.11.2]-heneicosane-20-propionic acid tetradecyl ester
Inorganic filler: silica
Fluorescent powder: yttrium-aluminum-garnet (YAG)

Evaluation of Properties of Compositions and Cured Products

The viscosity of each composition and the properties of each cured product were evaluated using the methods described below. Curing was conducted by heating the resin composition for 2 hours at 100° C. and then for a further 4 hours at 150° C. The results are shown in Tables 3 to 6.

(1) Viscosity

Viscosity at 25° C. was measured with a BM-type rotational viscometer manufactured by Toki Sangyo Co., Ltd.

(2) Cured Product External Appearance

The external appearance of the cured product was inspected visually for discoloration and transparency.

(3) Hardness

Hardness was measured for a rod-like cured product in accordance with the Japanese Industrial Standard (JIS) K6301 (type D).

TABLE 2

| Example | | 6 | 7 | 8 |
|---|---|---|---|---|
| Hydrogensiloxane | Type | F | G | H |
| | Quantity (g) | 31.6 | 117 | 29.7 |
| 1-allyl-3,5-diglycidylisocyanurate | Quantity (g) | 56.5 | 56.5 | 56.5 |
| Compound | | VI | VII | VIII |
| External appearance | | Colorless transparent liquid | Colorless transparent liquid | Colorless transparent liquid |
| Epoxy equivalent weight | g/mol | 196 | 344 | 155 |
| Elemental analysis (values in parentheses are theoretical values) | C | 0.4891 (0.4909) | 0.4108 (0.4189) | 0.4944 (0.504) |
| | Si | 0.0944 (0.0957) | 0.2137 (0.2177) | 0.1067 (0.1071) |
| | O | 0.2482 (0.2452) | 0.2419 (0.2325) | 0.2419 (0.2319) |
| | N | 0.1066 (0.1073) | 0.0614 (0.0611) | 0.0932 (0.0962) |
| | H | 0.0617 (0.0609) | 0.0722 (0.0698) | 0.0638 (0.0608) |

Examples 9 to 25, Comparative Examples 1 to 7

Preparation of Compositions

Each of the compounds I to III and the curing agent and the like in the quantities (parts by mass) shown below in Tables 3 to 6 were mixed together thoroughly in a planetary mixer, (4) Glass Transition Temperature and Coefficient of Linear Expansion A test piece having a width of 5 mm, a thickness of 4 mm and a length of 15 mm was cut out from the cured product. Using a thermal analyzer EXSTAR6000 TMA (manufactured by SII Nanotechnology Inc.), the test piece was heated from −100° C. to 300° C. at a rate of temperature increase of 5° C./minute. A point of inflexion in the elongation curve was recorded as a glass transition temperature (Tg). Average expansion coefficients in a temperature region below Tg and the one above Tg respectively were determined.

(5) Flexural Strength and Flexural Elastic Modulus

A test piece having a width of 5 mm, a thickness of 4 mm and a length of 100 mm was cut out from the cured product. Flexural strength and flexural elastic modulus were determined in accordance with JIS K6911 using an Autograph measuring device AGS-50 (manufactured by Shimadzu Corporation).

(6) Light Transmittance

The light transmittance ($T_0$) for wavelengths of 300 to 800 nm for a cured product of thickness 1 mm was measured using a spectrophotometer U-4100 (manufactured by Hitachi High-Technologies Corporation). Furthermore, the light transmittance ($T_1$) of the cured product after heated at 150° C. for 400 hours was also measured in the same manner, and the ratio $T_1/T_0$(%) was determined.

(7) Brightness

An LED device was prepared using the method described below, and left standing at 85° C. for 1,000 hours. Subsequently, a 10 mA current was applied to the LED to activate the LED, and the brightness (mlm) was measured using a LP-3400 device manufactured by Otsuka Electronics Co., Ltd.

Preparation of the LED Device

Using a premolded LED package (3 mm×3 mm×1 mm, diameter of opening: 2.6 mm) in which the base portion of the opening had been plated with silver, an InGaN-based blue light emitting element was secured to the base portion using a silver paste. Subsequently, the light emitting element was connected to external electrodes using a gold wire. One of the above compositions was used to fill the package opening, and the composition was then cured by heating for one hour at 100° C. and then for a further two hours at 150° C., thereby encapsulating the light emitting element. 25 packages were prepared using each of the compositions.

(8) Temperature Cycle Test, and Lighting Test Under High Temperature and High Humidity Ten of the LED devices thus obtained were subjected to a temperature cycle test (−40° C. to 125° C., 1,000 cycles and 2,000 cycles), and the number of devices in which cracks were visible upon inspection under a microscope was counted.

Ten of the LED devices were activated and lit for 500 hours by passing a current of 50 mA through the LED under conditions of high temperature and high humidity (65° C., 95% RH), and then checked under a microscope for the existence of cracks and/or discoloration.

TABLE 3

| Component | Example | | | | | Comparative example | |
| --- | --- | --- | --- | --- | --- | --- | --- |
| | 9 | 10 | 11 | 12 | 13 | 1 | 2 |
| Compound I | 65.7 | | | | 40 | | |
| Compound II | | 71.9 | | | | | |
| Compound III | | | 71.4 | | | | |
| Compound IV | | | | 50.9 | | | |
| Epoxy I | | | | | | 14.6 | 37.1 |
| Epoxy II | | | | | | | 50 |
| Curing agent | 33.7 | 28.1 | 28.6 | 49.1 | 45.4 | 62.9 | 50 |
| Curing catalyst | 0.32 | 0.32 | 0.32 | 0.32 | 0.32 | 0.32 | |
| Adhesion-imparting agent | 0.25 | 0.25 | 0.25 | 0.25 | 0.25 | 0.25 | 0.25 |
| External appearance | colorless transparent | colorless transparent | colorless transparent | colorless transparent | colorless transparent | colorless transparent | faint yellow transparent |
| Hardness (type D) | 73 | 55 | 65 | 85 | 83 | 87 | 85 |
| Viscosity (25° C.) | 1.3 | 1.8 | 2.1 | 0.6 | 0.8 | 0.5 | 1.5 |
| Glass transition temperature (° C.) | 109 | 98 | 101 | 138 | 120 | 165 | 135 |
| Expansion coefficient (below Tg) | 122 | 125 | 120 | 98 | 103 | 58 | 65 |
| Expansion coefficient (above Tg) | 221 | 210 | 220 | 200 | 175 | 130 | 135 |
| Flexural strength (MPa) | 65 | 10* | 45 | 78 | 85 | 110 | 120 |
| Flexural elastic modulus (MPa) | 780 | 350** | 600 | 1100 | 850 | 1700 | 1500 |
| Light transmittance $T_0$ (%) | 98 | 98 | 97 | 98 | 98 | 98 | 95 |
| Light transmittance after heating $T_1/T_0$ (%) | 95 | 95 | 95 | 95 | 95 | 55 | 60 |

*The sample did not break upon flexural testing, and therefore the tensile strength was measured.
**The tensile elastic modulus was measured.

TABLE 4

| Component | Example | | | | Comparative example | |
| --- | --- | --- | --- | --- | --- | --- |
| | 14 | 15 | 16 | 17 | 1 | 3 |
| Compound V | 54.3 | | | 45.6 | | |
| Compound VI | | 53.8 | | | | |
| Compound VII | | | 67.2 | | | |
| Epoxy I | | | | | 15.2 | 37.1 |
| Epoxy II | | | | | | 50 |
| Curing agent | 45.7 | 46.2 | 32.8 | 39.2 | 62.9 | 50 |

TABLE 4-continued

|  | Example | | | | Comparative example | |
|---|---|---|---|---|---|---|
| Component | 14 | 15 | 16 | 17 | 1 | 3 |
| Curing catalyst | 0.32 | 0.32 | 0.32 | 0.32 | 0.32 | 0.32 |
| Adhesion-imparting agent | 0.25 | 0.25 | 0.25 | 0.25 | 0.25 | 0.25 |
| External appearance | colorless transparent | colorless transparent | colorless transparent | colorless transparent | colorless transparent | faint yellow transparent |
| Hardness (type D) | 95 | 88 | 69 | 83 | 87 | 85 |
| Viscosity (25° C.) | 14.8 | 12 | 1.23 | 0.8 | 0.5 | 1.5 |
| Glass transition temperature (° C.) | 175 | 155 | 110 | 120 | 165 | 135 |
| Expansion coefficient (below Tg) | 82.1 | 90.1 | 160 | 103 | 58 | 65 |
| Expansion coefficient (above Tg) | 167 | 170 | 220 | 175 | 130 | 135 |
| Flexural strength (MPa) | 52 | 55 | 40 | 85 | 110 | 120 |
| Flexural elastic modulus (MPa) | 2065 | 1300 | 800 | 850 | 1700 | 1500 |
| Light transmittance $T_0$ (%) | 99 | 99 | 98 | 98 | 98 | 95 |
| Light transmittance after heating $T_1/T_0$ (%) | 89 | 90 | 92 | 93 | 55 | 60 |
| Brightness (after 85° C./1000 hours) | 88 | 82 | 83 | 80 | 30 | 35 |

TABLE 5

|  | Example | | | | | Comparative example | |
|---|---|---|---|---|---|---|---|
| Component | 18 | 19 | 20 | 21 | 22 | 4 | 5 |
| Compound V | 54.3 | 54.3 | 54.3 | 54.3 | 54.3 | | |
| Epoxy I | | | | | | 37.1 | 37.1 |
| Curing agent | 45.7 | 45.7 | 45.7 | 45.7 | 45.7 | 62.9 | 62.9 |
| Curing catalyst | 0.32 | 0.32 | 0.32 | 0.32 | 0.32 | 0.32 | 0.32 |
| Antioxidant I | 0.3 | | | 0.3 | | 0.3 | 0.3 |
| Antioxidant II | | 0.3 | | | 0.3 | | |
| Ultraviolet absorber | | | 0.3 | 0.3 | 0.3 | | 0.3 |
| Adhesion-imparting agent | 0.25 | 0.25 | 0.25 | 0.25 | 0.25 | 0.25 | 0.25 |
| External appearance | colorless transparent | colorless transparent | colorless transparent | colorless transparent | colorless transparent | colorless transparent | colorless transparent |
| Hardness (type D) | 95 | 95 | 95 | 95 | 95 | 87 | 85 |
| Viscosity (25° C.) | 14.8 | 14.7 | 14.5 | 14.8 | 14.6 | 0.5 | 1.5 |
| Glass transition temperature (° C.) | 175 | 176 | 177 | 173 | 175 | 165 | 135 |
| Expansion coefficient (below Tg) | 82.1 | 83.2 | 83.1 | 82.1 | 82.1 | 58 | 65 |
| Expansion coefficient (above Tg) | 167 | 167 | 166 | 167 | 165 | 130 | 135 |
| Flexural strength (MPa) | 52 | 53 | 52 | 52 | 52 | 110 | 120 |
| Flexural elastic modulus (MPa) | 2065 | 2077 | 2066 | 2078 | 2071 | 1700 | 1500 |
| Light transmittance $T_0$ (%) | 99 | 99 | 98 | 99 | 99 | 98 | 95 |
| Light transmittance after heating $T_1/T_0$ (%) | 93 | 94 | 90 | 95 | 95 | 66 | 70 |
| Brightness (after 85° C./1000 hours) | 87 | 86 | 93 | 95 | 94 | 36 | 50 |

TABLE 6

| Component | Example 23 | Example 24 | Example 25 | Comparative example 6 | Comparative example 7 |
|---|---|---|---|---|---|
| Compound V | 54.3 | 54.3 | | | |
| Compound VIII | | | 50.43 | | |
| Epoxy I | | | | 37.1 | 37.1 |
| Curing agent | 45.7 | 45.7 | 49.57 | 62.9 | 62.9 |
| Curing catalyst | 0.32 | 0.32 | 0.32 | 0.32 | 0.32 |
| Antioxidant I | 0.3 | 0.3 | 0.3 | 0.3 | 0.3 |
| Phosphor | 30 | | 30 | 30 | |
| Inorganic filler | | 30 | 30 | | 30 |
| Adhesion-imparting agent | 0.25 | 0.25 | 0.25 | 0.25 | 0.25 |
| External appearance | yellow | colorless transparent | colorless transparent | colorless transparent | colorless transparent |
| Hardness (type D) | 95 | 97 | 87 | 87 | 88 |
| Viscosity (25° C.) | 22.4 | 16.6 | 36.5 | 0.55 | 0.77 |
| Glass transition temperature (° C.) | 175 | 176 | 189 | 167 | 171 |
| Expansion coefficient (below Tg) | 82.1 | 79.3 | 102 | 59 | 57 |
| Expansion coefficient (above Tg) | 166 | 165 | 180 | 130 | 131 |
| Flexural strength (MPa) | 56 | 55 | 33 | 115 | 120 |
| Flexural elastic modulus (MPa) | 2099 | 2104 | 2230 | 1688 | 1710 |
| Light transmittance $T_0$ (%) | 30 | 99 | 25 | 28 | 97 |
| Light transmittance after heating $T_1/T_0$ (%) | 27 | 94 | 22 | 11 | 45 |
| Brightness (after 85° C./1000 hours) | 86 | 83 | 77 | 21 | 22 |

TABLE 7

| Composition | | Example 5 | Example 9 | Example 14 | Example 18 | Example 21 | Example 23 | Example 24 | Example 25 |
|---|---|---|---|---|---|---|---|---|---|
| Temperature cycle test (−40° C. to 125° C.) devices with cracks/number of devices tested | 1000 cycles | 0/10 | 0/10 | 0/10 | 0/10 | 0/10 | 0/10 | 0/10 | 1/10 |
| | 2000 cycles | 0/10 | 0/10 | 3/10 | 2/10 | 2/10 | 1/10 | 0/10 | 8/10 |
| High-temperature, high-humidity lighting test (after 65° C./95% RH, 50 mA, 500 hours) | | no faults | no faults | slight yellowing | no faults | no faults | no faults | no faults | no faults |

TABLE 8

| Composition | | Comparative example 1 | Comparative example 5 | Comparative example 6 | Comparative example 7 |
|---|---|---|---|---|---|
| Temperature cycle test (−40° C. to 125° C.) devices with cracks/number of devices tested | 1000 cycles | 10/10 | 10/10 | 6/10 | 3/10 |
| | 2000 cycles | 10/10 | 10/10 | 10/10 | 10/10 |
| High-temperature, high-humidity lighting test (after 65° C./95% RH, 50 mA, 500 hours) | | discoloration | discoloration | discoloration | discoloration |

As shown in the tables above, compared with the cured products of the comparative examples that did not include an organopolysiloxane of the present invention, the cured products obtained from the compositions comprising an organopolysiloxane of the present invention exhibited superior light transmittance, and suffered little reduction in brightness and no discoloration even in the lighting test conducted under conditions of high temperature and high humidity. Moreover, they underwent no cracking upon temperature cycle testing although the cured products of the present invention exhibited a high level of hardness. Therefore, the organopolysiloxane of the present invention and the composition comprising the organopolysiloxane yield a cured product having excellent light resistance and crack resistance, and are useful for encapsulating optical semiconductor elements.

What is claimed is:

1. An organopolysiloxane, represented by a formula (1) shown below and having (3,5-diglycidylisocyanuryl)alkyl groups represented by a formula (2) at least at both terminals of a main chain thereof:

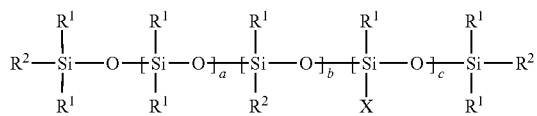

(1)

wherein each $R^1$ represents, independently, a substituted or unsubstituted monovalent hydrocarbon group of 1 to 20 carbon atoms, $R^2$ is a group represented by the formula (2) shown below, X is a group represented by a formula (3) shown below, a represents an integer of 0 to 100 and b represents an integer of 0 to 30, provided that $1 \leq a+b$, and c represents an integer of 1 to 10,

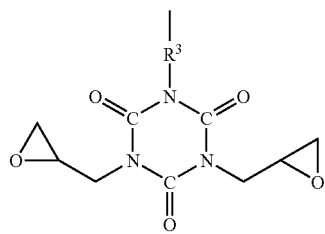

(2)

wherein $R^3$ represents an alkylene group of 2 to 12 carbon atoms,

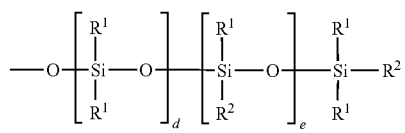

(3)

wherein $R^1$ and $R^2$ are as defined above, d represents an integer of 0 to 30, and e represents an integer of 0 to 30.

2. The organopolysiloxane according to claim 1, wherein $R^3$ is a propylene group.

3. A composition for encapsulating an optical semiconductor element, said composition comprising components (A), (C) and (D) listed below:
   (A) 100 parts by mass of the organopolysiloxane according to claims 1 or 2,
   (C) 10 to 100 parts by mass of a curing agent, and
   (D) a curing catalyst in an amount of 0.05 to 3 parts by mass per 100 parts by mass of a combination of component (A) and component (C).

4. The composition according to claim 3, further comprising (B) an epoxy compound or resin having no siloxane bonds in an amount of 1 to 100 parts by mass per 100 parts by mass of component (A).

5. The composition according to claim 3, further comprising (H) an adhesion-imparting agent in an amount of 0.1 to 3 parts by mass per 100 parts by mass of a combination of component (A) and component (C).

6. The composition according to claim 3, further comprising (E) an antioxidant in an amount of 0.1 to 5 parts by mass per 100 parts by mass of a combination of component (A) and component (C).

7. The composition according to claim 3, further comprising (F) a photostabilizer in an amount of 0.1 to 5 parts by mass per 100 parts by mass of a combination of component (A) and component (C).

8. The composition according to claim 3, further comprising (G) fluorescent powder in an amount of 1 to 100 parts by mass per 100 parts by mass of a combination of component (A) and component (C).

9. The composition according to claim 3, further comprising (I) an inorganic filler in an amount of 1 to 100 parts by mass per 100 parts by mass of a combination of component (A) and component (C).

10. The composition according to claim 3, wherein the curing agent (C) is an acid anhydride.

11. The composition according to claim 4, wherein the epoxy compound or resin having no siloxane bonds (B) is an alicyclic epoxy compound or resin, or an epoxy compound or resin having an isocyanurate ring.

12. The composition according to claim 6, wherein the antioxidant (E) is a hindered phenol-based antioxidant or a phosphorus-based antioxidant.

13. The composition according to claim 7, wherein the photostabilizer (F) is a hindered amine-based photostabilizer.

14. The composition according to claim 3, wherein the curing catalyst (D) is a phosphonium salt.

15. The composition according to claim 5, wherein the adhesion-imparting agent (H) is a mercaptosilane coupling agent.

\* \* \* \* \*